United States Patent
Harder et al.

(10) Patent No.: US 11,413,541 B2
(45) Date of Patent: Aug. 16, 2022

(54) GENERATION OF CONTEXT-AWARE, PERSONALIZED CHALLENGES IN COMPUTER GAMES

(71) Applicant: Electronic Arts Inc., Redwood City, CA (US)

(72) Inventors: Jesse Harder, Oakland, CA (US); Harold Chaput, Belmont, CA (US); Mohsen Sardari, Redwood City, CA (US); Navid Aghdaie, San Jose, CA (US); Kazi Zaman, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 94 days.

(21) Appl. No.: 16/891,723

(22) Filed: Jun. 3, 2020

(65) Prior Publication Data
US 2021/0379493 A1    Dec. 9, 2021

(51) Int. Cl.
| | | |
|---|---|---|
| *A63F 13/69* | (2014.01) | |
| *A63F 13/67* | (2014.01) | |
| *A63F 13/46* | (2014.01) | |
| *G06N 20/00* | (2019.01) | |
| *A63F 13/88* | (2014.01) | |

(52) U.S. Cl.
CPC ............ *A63F 13/69* (2014.09); *A63F 13/46* (2014.09); *A63F 13/67* (2014.09); *A63F 13/88* (2014.09); *G06N 20/00* (2019.01); *A63F 2300/6027* (2013.01); *A63F 2300/6036* (2013.01)

(58) Field of Classification Search
None
See application file for complete search history.

(56) References Cited

U.S. PATENT DOCUMENTS

| | | | | |
|---|---|---|---|---|
| 2017/0323211 | A1* | 11/2017 | Bencke | G06Q 10/0639 |
| 2018/0341903 | A1* | 11/2018 | Keen | G06Q 10/063118 |
| 2019/0091567 | A1* | 3/2019 | Huffman | A63F 13/67 |
| 2019/0232168 | A1* | 8/2019 | Benedetto | A63F 13/798 |
| 2019/0324780 | A1* | 10/2019 | Zhu | G06F 16/285 |

* cited by examiner

*Primary Examiner* — Jason T Yen
(74) *Attorney, Agent, or Firm* — Middleton Reutlinger (57) ABSTRACT

According to an aspect of this specification, there is described a computer implemented method comprising: receiving input data, the input data comprising data relating to a user of a computer game; generating, based on the input data, one or more candidate challenges for the computer game; determining, using a machine-learned model, whether each of the one or more of the candidate challenges satisfies a threshold condition, wherein the threshold condition is based on a target challenge difficultly; in response to a positive determination, outputting the one or more candidate challenges that satisfy the threshold condition for use in the computer game by the user.

17 Claims, 7 Drawing Sheets

GENERATION OF CONTEXT-AWARE, PERSONALIZED CHALLENGES IN COMPUTER GAMES

BACKGROUND

In-game challenges are an important aspect of many computer games, providing additional motivation to a user to continue playing and increasing in-game engagement and variety. There are many factors to consider when designing challenges for players in a game. When personalization of challenges is also considered, the preferences of the individual player must be factored in. However, manual curation of challenges is unscalable, making the task of personalized challenge generation very laborious.

SUMMARY

According to a first aspect of this specification, there is described a computer implemented method comprising: receiving input data, the input data comprising data relating to a user of a computer game; generating, based on the input data, one or more candidate challenges for the computer game; determining, using a machine-learned model, whether each of the one or more of the candidate challenges satisfies a threshold condition, wherein the threshold condition is based on a target challenge difficultly; in response to a positive determination, outputting the one or more candidate challenges that satisfy the threshold condition for use in the computer game by the user.

Generating, based on the input data, the one or more candidate challenges for the computer game may comprise: determining one or more search constraints based on the input data; and searching a space of challenge parameters based on the one or more constraints to generate the one or more candidate challenges.

The method may further comprise: in response to a negative determination that one or more of the candidate challenges satisfies the threshold condition: updating the one or more search constraints based on output of the machine learning model; re-searching the space of challenge parameters based on the one or more updated constraints to generate one or more further candidate challenges; determining, using the machine-learned model, whether the one or more of the further candidate challenges satisfies the threshold condition; and in response to a positive determination, outputting the one or more further candidate challenges that satisfy the threshold condition for use in the computer game by the user. Determining the one or more search constraints based on the input data may comprise processing the input data using a game-specific logic.

The one or more constraints may comprise: a cost-reward metric; a consistency condition for preventing mutually exclusive challenge parameters in each of the one or more candidate challenges; and/or game-specific in-game logic constraints.

The input data may comprise metric data generated from in-game data associated with the user of the computer game. The input data may further comprise one or more of: in-game economic data; designer constraints; and/or real-world data extracted from a news feed using natural language processing.

Determining, using a machine-learned model, whether each of the one or more of the candidate challenges satisfies a threshold condition may comprise: generating, using the machine-learned model, a score for each of the one or more candidate challenges, the score indicative of a difficultly of the candidate challenge; and comparing the score to a threshold score associated with the user.

According to a further aspect of this specification, there is described apparatus comprising one or more processors and a memory, the memory comprising instructions that, when executed by the one or more processors, cause the apparatus to perform operations comprising: receiving input data, the input data comprising data relating to a user of a computer game; generating, based on the input data, one or more candidate challenges for the computer game; determining, using a machine-learned model, whether each of the one or more of the candidate challenges satisfies a threshold condition, wherein the threshold condition is based on a target challenge difficultly; in response to a positive determination, outputting the one or more candidate challenges that satisfy the threshold condition for use in the computer game by the user.

Generating, based on the input data, one or more candidate challenges for the computer game may comprise: determining one or more search constraints based on the input data; and searching a space of challenge parameters based on the one or more constraints to generate the one or more candidate challenges.

The operations may further comprise: in response to a negative determination that one or more of the candidate challenges satisfies the threshold condition: updating the one or more search constraints based on output of the machine learning model; re-searching the space of challenge parameters based on the one or more updated constraints to generate one or more further candidate challenges; determining, using the machine-learned model, whether the one or more of the further candidate challenges satisfies the threshold condition; and in response to a positive determination, outputting the one or more further candidate challenges that satisfy the threshold condition for use in the computer game by the user.

Determining one or more search constraints based on the input data may comprise processing the input data using a game-specific logic. The one or more constraints may comprise: a cost-reward metric; a consistency condition for preventing mutually exclusive challenge parameters in each of the one or more candidate challenges; and/or game-specific in-game logic constraints.

The input data may comprises metric data generated from in-game data associated with the user of the computer game. The input data may further comprise one or more of: in-game economic data; designer constraints; and/or real-world data extracted from a news feed using natural language processing.

Determining, using a machine-learned model, whether each of the one or more of the candidate challenges satisfies a threshold condition may comprise: generating, using the machine-learned model, a score for each of the one or more candidate challenges, the score indicative of a difficultly of the candidate challenge; and comparing the score to a threshold score associated with the user.

According to a further aspect of this specification, there is described a computer implemented method comprising: receiving player data from a plurality of players relating to a plurality of in-game challenges; determining a proxy measure of difficulty for each of the plurality of in-game challenges based on the received player data; processing each of the in-game challenges using one or more parametrised models to generate a prospective difficulty score for each of the in-game challenges; comparing each of the prospective difficulty scores to a corresponding proxy measure of difficulty for the in-game challenge; and updating parameters of the one or more parametrised models based on the comparisons to generate a machine-learned model.

The proxy measure of difficulty may be based on one or more of: a number of players completing the challenge; a time taken to complete the challenge; a fraction of players that start the challenge and go on to complete the challenge; and/or a type of player who completes the challenge.

The method may further comprise: testing the machine-learned model on a test dataset comprising a plurality of in-game challenges; and updating the proxy measure of difficulty based on the testing.

The plurality of players may divided into a plurality of player types in dependence on the player data. The proxy measure of difficulty for each of the plurality of in-game challenges may comprises a plurality of difficulty measures, each corresponding to a player type. The one or more parameterised models may comprise a plurality of parameterised models, each corresponding to one of the player types and updated based on data from the corresponding player type.

BRIEF DESCRIPTION OF THE DRAWINGS

Embodiments will now be described by way of non-limiting examples, in which.

DETAILED DESCRIPTION

Figure 1:
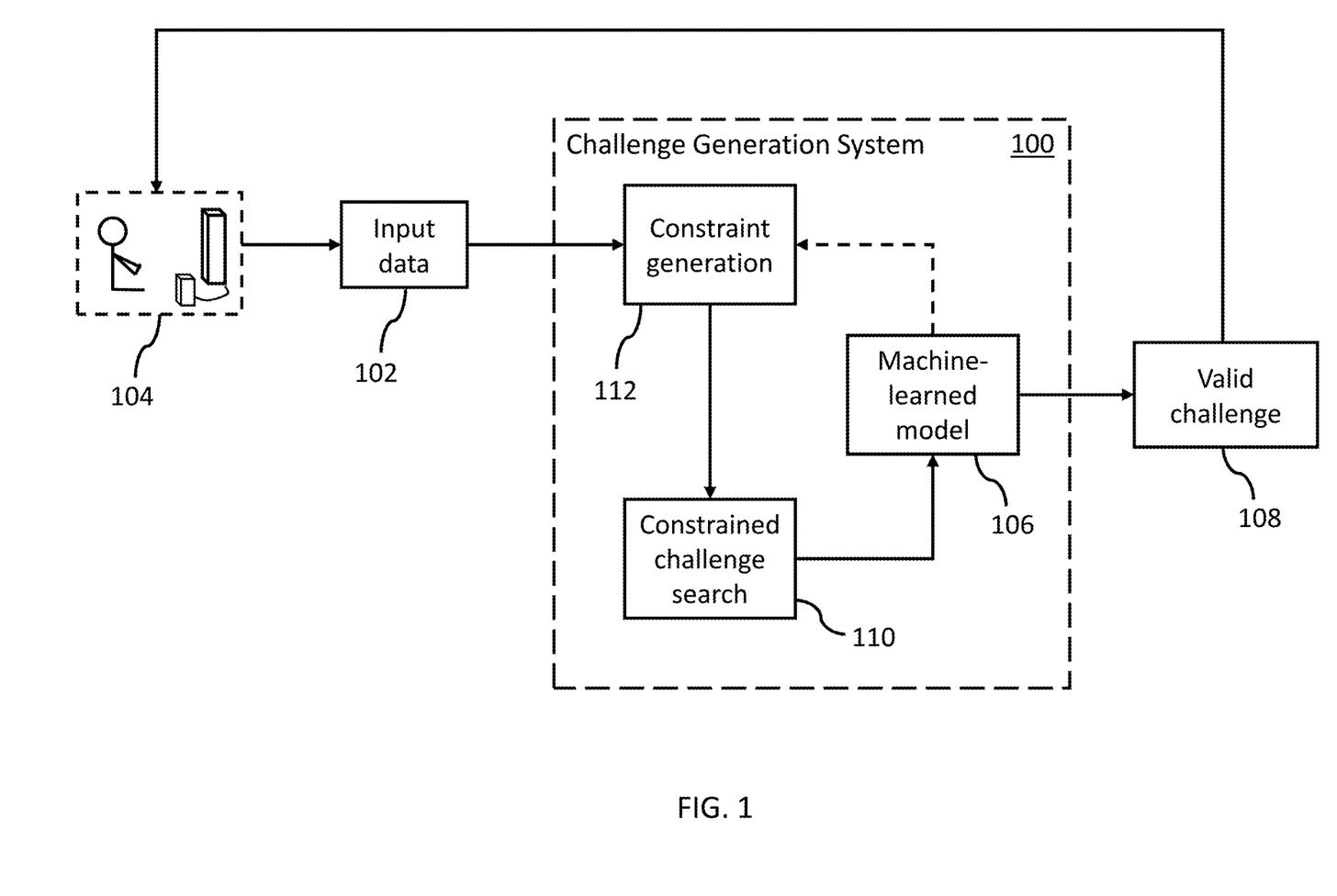
FIG. 1 shows an overview of the operation of an example challenge generation system for generating challenges for use in computer games.

FIG. 1 shows an overview of the operation of a challenge generation system too for generating context-aware, personalized challenges for use in computer games. The system too uses artificial intelligence (AI) components to generate personalized and/or context-aware challenges for use in computer games. Machine learning models are trained on play data to recommend modifications to challenges, for example based on a player type. A natural language processing (NLP) system may be used to extract pertinent real-world information from news feeds to contextualize challenges to what is happening in the real world. Complex concepts like difficulty are learned by machine learning models trained on play data from past challenges. These pieces together modify a search process to find optimal challenges to give to individual players.

The challenge generation system 100 receives input data 102 that comprises data relating to a computer game being played, or that has been played, by a user 104 (also referred to herein as a "player"). The system 100 uses the input data to generate one or more candidate challenges for the computer game that are personalized to the player 104. A machine-learned model 106 is used to assess each of the candidate challenges in order to determine if any of the candidate challenges is suitable for the player 104. The assessment of suitability is based on satisfying a threshold condition that is related to challenge difficulty. If a candidate challenge satisfies the threshold condition, it is output for use as a challenge in the computer game being played by the player 104. Such a challenge may be referred to as a "valid challenge" 108. If no candidate challenge satisfies the threshold condition, further candidate challenges may be generated using the output of the machine-learned model 106.

In some implementations, generating the one or more candidate challenges uses a constrained search 110 over a space of challenge parameters based on constraints 112 generated from the input data 102. In these implementations, output of the machine-learned model 106 may be used to define further constraints 112 on the search if none of the initial candidate challenges satisfies the threshold condition.

The input data 102 comprises data relating to a computer game being played by a player 104. In some implementations, the input data 102 comprises data derived from in-game data generated while a user is playing a particular computer game. The input data may comprise one or more in-game statistics. Examples of such in game data include player preferences (such as an in-game team/map/piece of equipment/class/character the player prefers); play time; player play-styles; previously completed challenges; previously started challenges; in-game scores; challenge completion statistics and the like.

The input data 102 may be taken directly from in-game statistics that are by default recorded by the game. For example, some games actively monitor in-game statistics to present to the player 104 upon request, such as playtime, recent playtime (e.g. a total time played within the last week); completion percentages; preferred teams/equipment/maps and the like.

Alternatively or additionally, the input data 102 may comprise data generated by applying metrics to in-game data collected while the player 104 is playing the game. For example, user preferences and/or abilities may be inferred from in-game use of features of the game and/or in-game performance.

The input data 102 may further comprise data from a user profile associated with the player 104. The user profile may explicitly request user preferences from the player 104 during a profile creation process. The profile creation processes may request a preferred difficulty level, a preferred in-game faction (such as a team that the user supports in a sports simulation game), a preferred playstyle or the like.

The input data 102 may further comprise additional forms of data, such as in-game economy data, developer input parameters, and/or information about current real-world events extracted from a news feed. Examples of these additional forms of input data are described in further detail below in relation to FIG. 3.

The system too uses the input data 102 to generate one or more challenges 108 for use in the game. A challenge is defined by a set of in-game conditions that must be satisfied by the player 104 in order to complete the challenge. The set of conditions may comprise one or more parametrised in-game tasks that a user must complete. Each parametrised in-game tasks comprises a set of one or more task parameter values that define the task. In some implementations, two or more of the parametrised in-game tasks must all be completed in order to satisfy the challenge, e.g. the player must complete task A and task B in order to complete the challenge. In some implementations, two or more of the parametrised in-game tasks are be provided in the alternative, e.g. the player must complete task A or task B in order to complete the challenge.

The task parameters may comprise one or more numerical values. The numerical values may define threshold values of in-game parameters/scores/variables that must be met in order to be satisfied. The numerical values may define a threshold score that must be exceeded by the player in the course of a game, a threshold number of in-game victories, a threshold number of items of a particular type that must be collected, a threshold time in which an in-game task must be completed (e.g. finishing a race within a given race time). Many other examples are possible, and will be familiar to the person skilled in the art.

The task parameters may alternatively or additionally comprise one or more textual segments/values. The textual segments may define in-game features, variables and/or content used to define the challenges. The one or more textual segments may provide context for numerical values defining the challenge. The textual segments may comprise a name of an in-game team/character/player/item or the like that must (or must not) be used/obtained/won or the like by the player in order to complete the task. Textual segments may be grouped into sets depending on to what they refer. For example, there may be a set of textual segments that refer to teams in a game, a set that contains players in a given team, a set that refers to in-game competitions or the like.

In some implementations, the in game tasks that define the challenge may be based on pre-defined templates, which can be populated by the task parameters to define the task. For example, a template may be of the form "Score X points in Y games using team Z", where X and Y are numerical parameters and Z is a textual segment. The task may be based on a single template or a combination of a plurality of templates. Taking "Score X points in Y games using team Z" as an example, this may either be a single pre-defined template with three variables, or formed by combining a plurality of tasks, e.g. "Score X goals in Y games" and "Use only team Z"

In some implementations, a challenge may be associated with a time limit within which the challenge can be completed. The time limit may be a fixed end-date/time by which the conditions of the challenge need to be fulfilled in order for the challenge to be completed. For example, a challenge may specify that it is only available until a particular date/time, after which the challenge can no longer be completed. Alternatively, the time limit may be a fixed period of time from the start of the challenge in which the conditions of the challenge need to be fulfilled in order for the challenge to be completed. The start of the challenge may be defined, for example, by the player actively accepting the challenge.

In some implementations, a challenge may be associated with one or more rewards. The rewards may comprise in-game rewards. Examples of in-game rewards include: unlocking/providing in-game equipment or characters; in-game currency; unlocking additional game modes or levels; and/or an in-game collectable. The reward for the challenge may be a parameter of the challenge that is searched over in the constrained search 110.

Once a plurality of candidate challenges have been generated by the system, they are assessed using a machine-learned model 106. The machine-learned model 106 is a model that takes as input a challenge and outputs data indicative of the difficultly of the input challenge. In general, the output of the machine-learned model 106 may be any measure or proxy measure of the difficulty of the input challenge. The output data comprises one or more numerical scores. For example, the output of the machine-learned model 106 may be a single numerical score indicative of the difficulty of the challenge. Alternatively, the output of the machine-learned model 106 may be a plurality of numerical scores, each relating to a different aspect of the challenge. For example, the output of the machine-learned model 106 may comprise one or more of: a numerical value for an overall difficulty of the challenge; a numerical score for the difficulty of the challenge for each of a plurality of player types; a numerical score for the difficulty of the challenge for each of a plurality categories; a numerical score for the value of the challenge reward, either in isolation or with respect to the challenge difficulty; an estimated time required to compete the challenge; and/or an estimated completion rate for the challenge.

Each candidate challenge may be input into the machine-learned model in natural language form. The machine learned model 106 may comprise a natural language processing model that can interpret the challenge prior to assessing its difficulty. Alternatively, challenge parameters may be input into the machine-learned model 106 in a raw form.

In some implementations, the challenge generation system 100 may comprise a plurality of machine-learned models 106. Each of the machine learned models 106 in the plurality of machine-learned models may be associated with a different player type. The players 104 may be categorized into a plurality of categories depending on their in-game performance. The categories may comprise, for example, experienced players, casual players, hard-core players, new players or the like. When generating a challenge, the challenge generation system may select a machine-learned model 106 for use from the plurality of machine-leaned models based on the input data 102. For example, the input data 102 may indicated that the player 104 is a new player based on the total time the player 104 has spent playing the game. The challenge generation system 100 therefore selects that machine-learned model 106 associated with new players for use in assessing the candidate challenges.

Examples of machine-learned models 106 that may be used by the challenge generation system 100 include: one or more neural networks; a decision tree; a support vector machine; a regression model; and the like. Where a neural network is used, the neural network may, in some implementations, be a recurrent neural network and/or an LSTM network.

In some implementations, the machine learned model 106 is replaced by or augmented with a hand-crafted model. The hand-crafted model comprises a model that has been programmed by a developer for assessing one or more aspects of the candidate challenges against one or more threshold conditions. The hand-crafted model is not trained on/learned from training data, but instead analyses aspects of the candidate challenges using a pre-defined logic.

The machine-learned model 106 is pre-trained on training data to generate the output data indicative of the difficultly of the input challenge. Training the machine-learned model 106 is described below in further detail in relation to FIGS. 5 and 6.

The output of the machine-learned model 106 for each of the candidate challenges is compared to one or more threshold conditions (also referred to as constraint satisfaction criteria) to determine if the candidate challenge is suitable for use as in game challenge. If one or more of the challenges satisfies the threshold conditions, then those challenges are output for use in the game by the player 104 as valid challenges 108. The challenges may be stored in a memory, and presented to the player 104 at some future point when the player 104 plays the game. In some implementations, the player 104 may be provided with a plurality of the stored challenges when playing the game, and can choose one or more of the challenges to accept.

One or more of the threshold conditions relate to the difficulty of the candidate challenge. At its simplest, a threshold condition may be a threshold difficultly score that an overall difficulty of the challenge output by the machine-learned model 106 must exceed or not exceed, or a range of overall difficultly scores that an overall difficulty of the challenge output by the machine-learned model 106 must fall within. In implementations where the machine-learned model outputs multiple values, one or more threshold conditions may be applied to each of the values. For example, each of the outputs of the machine-learned model 106 may be associated with a different numerical range into which it must fall for the challenge to be accepted.

In general, the constraint satisfaction criteria/threshold conditions constrain viable challenges using "external" variables that are player-data driven (such as difficulty, preferences etc.), as opposed to "internal" variables that come from the designers (for example, team chemistry), or "system" variables that are there for functionality or efficiency (like internal consistency of the constraints). These external variables may be modeled from user data ahead of time and embedded in the system before launch, and/or can be updated on the fly as more data comes in from players who are using the system.

In some implementations, candidate challenges are generated based on a constrained search operation. Based on the input data 102, a game-specific logic is used to generate one or more search constraints 112 for the candidate challenge search 110. The constraints 112 may comprise numerical ranges of task parameters that can be used in the candidate challenges and/or constraints on particular textual segments that are allowed to be present in the challenges. The constraints may be based on a consistency condition for preventing mutually exclusive challenge parameters in each of the one or more candidate challenges and/or game-specific in-game logic constraints to prevent challenges that are impossible to complete in the game.

In some implementations, the constraints 112 may be formulated as a search query that is used to search 110 the space of challenge parameters. A fixed number of candidate challenges satisfying the search query may be output by the search 110 for assessment by the machine-learned model 106.

As an illustrative example, consider a sports simulation game. The input data 102 may comprise a sports team that the player 104 supports, a win-rate associated with player 104, and real-world data extracted from a news feed relating to said team. For example, the real-world data may indicating that a star player, X, of that sports team is currently injured. The constraint generation 112 system generates a set of constraints for the challenge search that specifies that the challenge must relate to the team the player 104 supports and that the challenge must have a condition "do not use player X". The set of constraints also comprises constraints based on the win-rate of the player 104, e.g. that the challenge parameters cannot require a win-rate that falls outside some range around the player 104 win-rate.

The challenge generation system 100 uses the constraints 112 to search 110 the space of challenge parameters to generate a plurality of challenges satisfying the constraints, such as "win 5 games in a row with team Y without using player X", "lose fewer than 2 games in competition Z with team Y without using player X", "win tournament Z with team Y without using player X" and the like.

Based on the player 104 win-rate, a machine-learned model 106 for assessing the candidate challenges is selected from a plurality of machine-leaned models stored by the challenge generation system 100. The machine-learned model 106 assesses each challenge to determine a challenge difficulty score for each challenge. The challenge difficulty score for each candidate challenge is compared to a threshold range of values. Challenges that satisfy the threshold condition 108 are output for presentation to the player 104.

Figure 2:
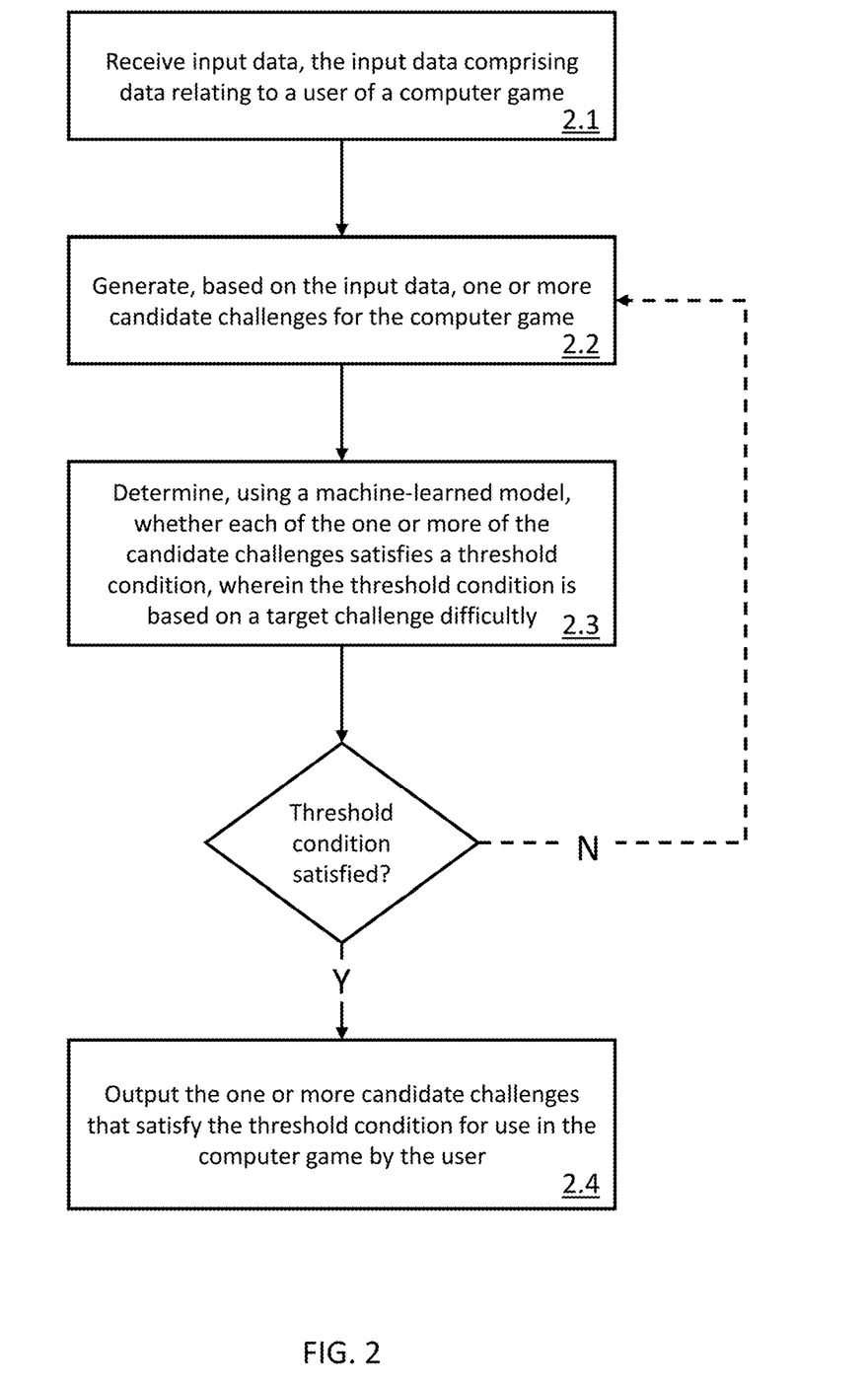
FIG. 2 shows a flow diagram of an example method for generating context-aware, personalized challenges for use in computer games.

FIG. 2 shows a flowchart of an example method for generating context-aware, personalized challenges for use in computer games. The method may be performed by one or more computing devices operating in one or more locations.

At operation 2.1, input data is received. The input data comprises data relating to a user of a computer game, such as metric data generated from in-game data associated with the user of the computer game. The input data may further comprise in-game economic data (such as values of in-game currencies, in-game prices and the like), designer constraints/parameters, and/or real-world data extracted from a news feed using natural language processing (for example, the data described below in relation to FIG. 4).

At operation 2.2, generating, one or more candidate challenges for the computer game are generated based on the input data. Generating one or more candidate challenges for the computer game may comprise determining one or more search constraints based on the input data. The search constraints may be determined using a game-specific logic, which may be manually coded by a developer. The constraints may include one or more of: a cost-reward metric; a consistency condition for preventing mutually exclusive challenge parameters in each of the one or more candidate challenges; and/or game-specific in-game logic constraints.

Based on the one or more constraints, a space of challenge parameters is searched to generate the one or more candidate challenges. In other words, a constrained search is performed across possible challenge parameters to determine one or more sets of challenge parameters that each define a candidate challenge.

At operation 2.3, a machine-learned model is used to determine whether each of the one or more of the candidate challenges satisfies a threshold condition. The threshold condition is based on a target challenge difficultly. For example, the machine-learned algorithm may receive parameters of the candidate challenge as input, and output one or more numerical scores indicative of the difficulty of the candidate challenge. If the one or more numerical scores associated with a particular candidate challenge satisfy a threshold condition, that candidate challenge satisfies the threshold condition. The threshold condition may be any one or more of: a score that a numerical score output by the machine-learned model must exceed; a score that a numerical score output by the machine-learned model must not exceed; or a range of scores that a numerical score output by the machine-learned model must fall within.

At operation 2.4, in response to a positive determination, the one or more candidate challenges that satisfy the threshold condition are output for use in the computer game by the user. The challenge may be stored in a challenge database for later retrieval and transmission to the user gaming device.

Optionally, in response to a negative determination, new candidate challenges may be generated based on the output of the machine-learned model and the processes repeated. The process may be repeated until a satisfactory challenge is found; i.e. operations 2.2 onwards may be iterated until a positive determination that one or more of the candidate challenges satisfies the threshold condition is made.

Each iteration of the process comprises updating the one or more search constraints based on output of the machine-learned model and re-searching (i.e. performing a further search) the space of challenge parameters based on the one or more updated constraints to generate one or more further candidate challenges. Updating the constraints may comprise any one or more of: altering one or more of the constraints used in the previous iteration; adding one or more additional constraints; and/or deleting one or more of the constraints from the previous iteration. Re-searching the space of challenge parameters may be performed in the same way as the initial search. Alternatively, the candidate challenges of the previous iteration may be used as a starting point for the re-search.

The machine-learned model is then used to assess whether any of the further candidate challenges satisfy the threshold condition. The assessment may be performed in the same way as described above in relation to operation 2.3. In response to a determination that one or more of the further candidate challenges satisfies the threshold condition, the one or more further candidate challenges that satisfy the threshold condition are output for use in the computer game by the user. The further challenges may be output in the same was as described above in relation to operation 2.4.

Figure 3:
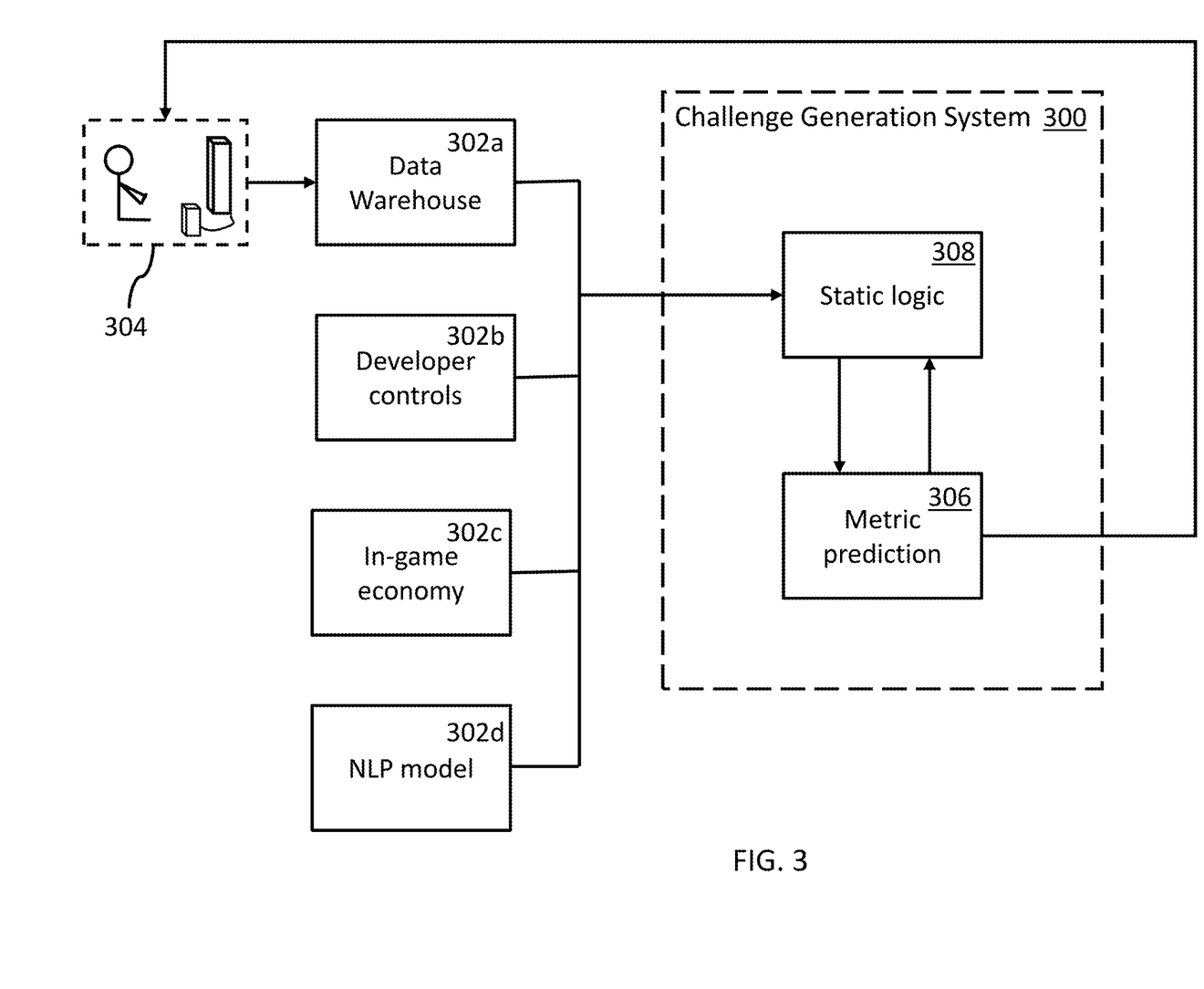
FIG. 3 shows an overview of the operation of a further example challenge generation system.

FIG. 3 shows an overview of the operation of a further example of a challenge generation system 300. The challenge generation system 300 takes as input a plurality of input data 302a-d, comprising in-game player 304 data relating to a particular game (such as the data described above in relation to FIG. 1) that is stored, for example, in a data warehouse 302a, one or more developer controls 302b, in-game economic data 302c, and one or more outputs from a natural language processing model 302d that has extracted current real-world information from one or more real-world textual sources (e.g. RSS feeds, newspapers or the like).

The one or more developer controls 302b provide external constraints for the challenge generation system 300 that may be controlled by a game developer. The developer controls 302b may allow a game developer to tweak constraints on the challenge generation, for example to promote a particular type of challenge, tie challenges to current in-game events or promotions, and/or avoid bugs in the challenge generation system 300.

The in-game economic data 302c provides information regarding the in-game value and/or scarcity of one or more in-game objects. The in-game economic data 302c is used by the challenge generation system 300 to generate candidate challenges that are consistent with and/or do not unbalance an in-game economy. The in-game economic data 302c can be used to control challenge rewards and/or check if challenges are realistic from an in-game economic perspective. The in-game economic data may relate to one or more of: in-game currency; in-game items; in-game rewards or the like. For example, the economic data may indicate that only a certain number of a specific item is currently available in the game. The challenge generation system 300 uses this information to apply constraints when generating candidate challenges that prevent the challenge requiring more than this number (or a fraction of this number) of the specific item.

Figure 4:
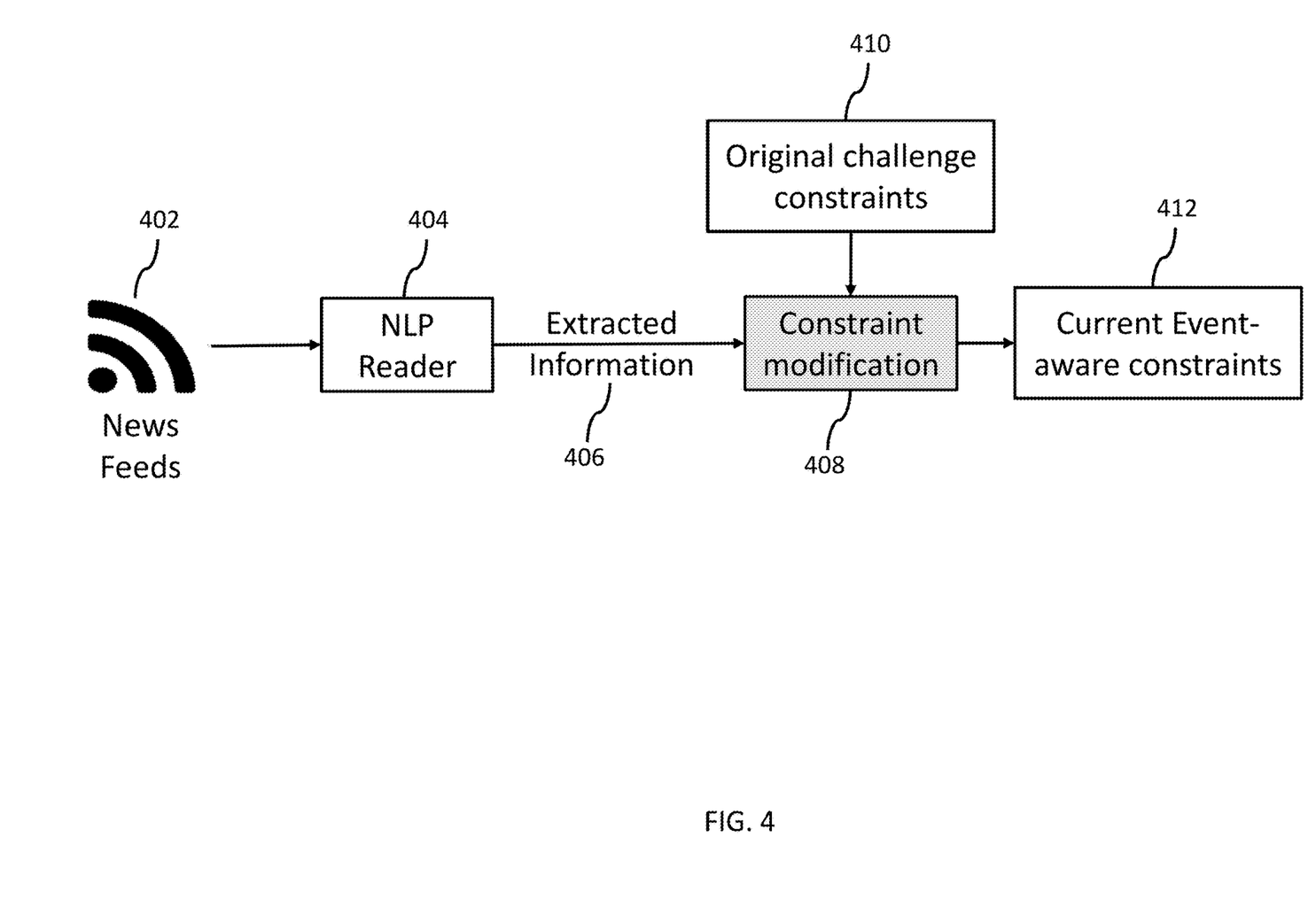
FIG. 4 shows an overview of a method for determining contextual data for use in a challenge generation system.

The one or more outputs from a natural language processing (NLP) model 302d comprise natural language data that has been extracted from real-world sources. The natural language data relate to current events in the real world, and may be used to modify constraints on the challenge search in order to generate challenges 412 that are relevant to current events. With reference to FIG. 4, real-world textual information 402 is received by a NLP model 404, which extracts game-relevant contextual information 406 from the real world textual information 402. The real-world textual information 402 may comprise a news feed providing information on current events that are relevant to the game. For example, if the game is a sports game, then the real world textual information 402 may comprise a news feed relating to the sport simulated by the game.

The NLP model 404 takes the real world textual information 402 and extracts game-relevant information 406 from it. The NLP model 404 may comprise a neural network model, such as a recurrent neural network or a long short-term memory (LSTM) network. Many other examples of NLP models 404 are known in the art. The extracted game-relevant information 406 may related to one or more in-game parameters. Returning to the example of a sports game, the real world textual information may indicate that a particular player of the sport is currently injured, and may take a number of weeks to recover. The NLP model may extract the identity of the player and that the plyer is unavailable for that period of time.

The extracted game-relevant information 406 is used by the challenge generation system to modify 408 one or more of the challenge constraints generated based on the other input data 410 (also referred to herein as the original challenge constraints) to generate current event-aware constraints 412 for use by the challenge generation system. A game-specific logic may be used in the constraint modification process 408. Modifying the original constraints 410 may comprise one or more of: adding one or more further constraints; removing one or more of the original constraints 410; and/or changing one or more parameters of the original constraints 410.

Referring again to FIG. 3, the received data 302a-d is input into a static logic 308 of the challenge generation system 300. The static logic 308 generates a plurality of candidate challenges for the player 304 of the game based on the input data 302a-d. The static logic may, for example comprise the constraint generation system and constrained challenge search described above in relation to FIG. 1.

The one or more candidate challenges output by the static logic 308 are assessed by a metric prediction module 306. The metric prediction module 306 uses one or more machine learned models to predict one or more measures (also referred to as metrics) of difficulty for each of the candidate challenges. Prediction of the one or more measures of difficulty proceeds as described above in relation to FIG. 1.

The output of the machine-learned model for each candidate challenge is compared to one or more threshold conditions relating to difficulty in order to determine if the challenge is suitable for use by the player 304. If one or more of the candidate challenges satisfies the threshold condition, those one or more challenges are output for use in the game by the user. If none of the candidate challenges satisfies the threshold condition, the output of the machine-learned model is passed back to the static logic 308 in order to update constraints on the challenge search and generate a new set of candidate challenges. The generation of candidate challenges, the assessment of the candidate challenges and the updating of the challenge constraints may be iterated until one or more challenges that satisfy the threshold condition are identified.

Figure 5:
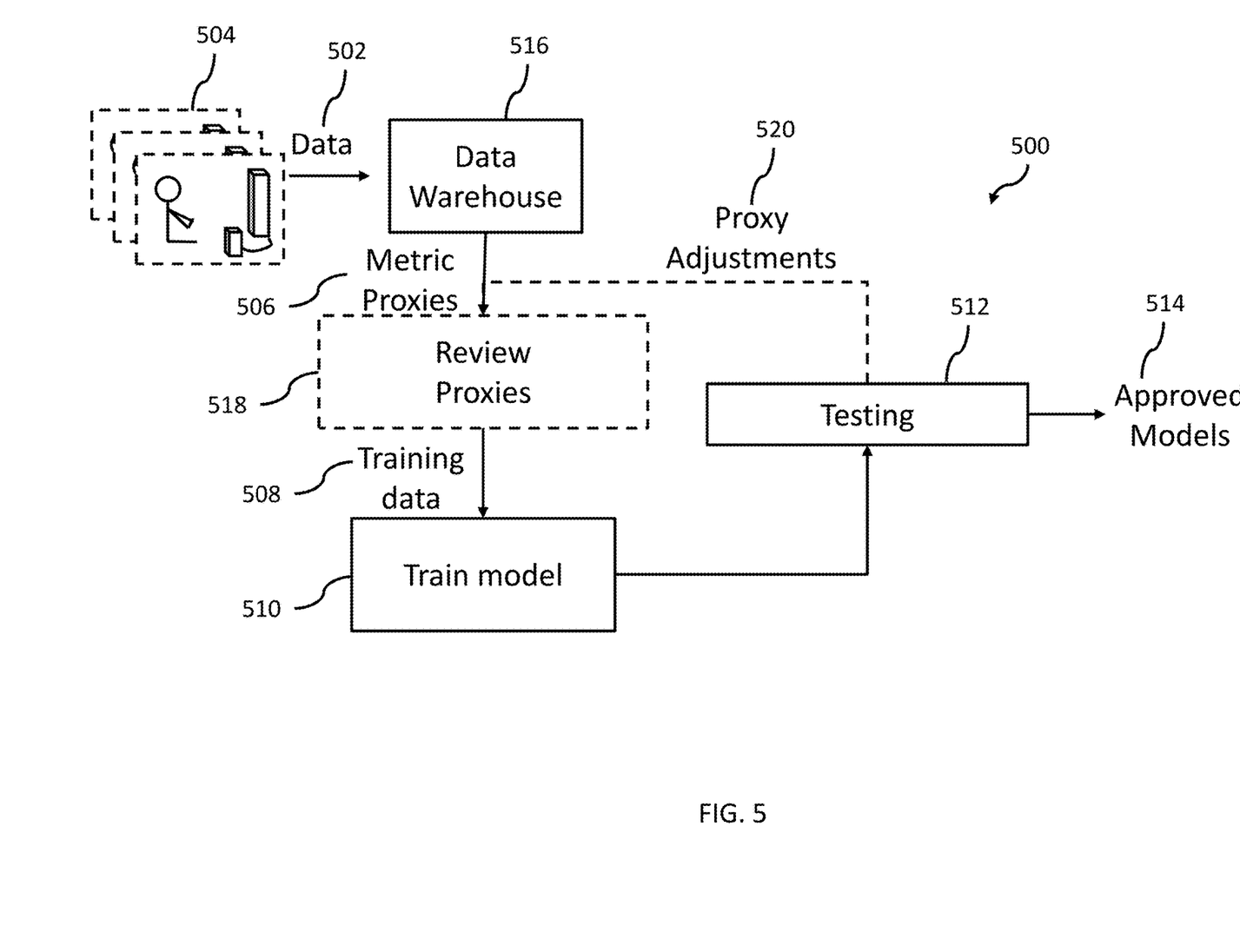
FIG. 5 shows an overview of an example method for training a machine-learned model for use in a challenge generation system.

FIG. 5 shows an overview of an example method 500 for training machine-learned models for use in a challenge generation system. The training method collects challenge related data 502 from a plurality of players 504 of a game, generates a measure of difficulty for each challenge based on a proxy metric 506 to generate training data 508, and trains a machine-learned model 510 on the training data 508 to predict the measure of difficulty for each challenge. The trained model is tested 512 to determine if it produces acceptable results and output 514 for use by a challenge generation system if so.

A plurality of pre-determined in-game challenges are provided to a plurality of players 504 of a game. The players 504 each attempt one or more of the in-game challenges as part of the course of normal gameplay. Data 502 relating to the completion of the challenges by the players 504 is collected and stored, for example in a data warehouse 516.

When a sufficient amount of challenge related data 502 has been collected, one or more proxy metrics of difficultly 506 (also referred to herein as a proxy measure of difficulty) are used to assess the difficulty of each of the pre-determined challenges. The proxy metric of difficultly 506 are based on the data 502 collected in relation to each of the predetermined challenges. For example, a completion rate for each challenge (i.e. the ratio of the number of players completing a challenge to the number of players starting that challenge) may be used as a proxy metric of difficulty 506, with a higher completion rate indicating a lower difficulty. Other potential proxy metrics of difficulty 506 may include the total number of challenge completions; statistics about the time taken to complete a challenge; the number of players in each player experience level completing a challenge; and/or user feedback regarding a challenge. Many other examples are possible. One or more of proxy metric 506 may be combined to provide an overall proxy metric of the difficulty of the challenges. For example, a mathematical formula may be used to combine proxy measures. The proxy metric 506 may comprise a weighted sum of statistics over the challenge related data.

In some implementations, a manual review 518 of the proxy metric of difficultly is performed by a game designer/developer to confirm that the proxy metric of difficulty produced realistic assessments of the difficulties of the challenges. If the reviewer approves the results of using the proxy metric, the dataset 508 is used for training the machine-learned model. If the reviewer considers that the proxy metric has generated inaccurate assessments of the difficulties of the challenges, then the proxy metric 506 may be updated and new values for the difficulties of the challenges generated based on the updated proxy metric. The reviewer may also manually edit the difficulty levels for each of the challenges to produce the training dataset 508.

The set of predetermined challenges, each with a measure of difficulty generated using the proxy metric 506, forms a labelled dataset that can be used to train a model 510 using machine learning. In some implementations, the labelled dataset may be divided into a training dataset 508 on which the machine-learned model 510 is trained, and a test dataset on which the model may be tested/verified 512. A supervised learning technique is used to train the model 510 on the training dataset 508. For example, the model may take as input parameters of a challenge, and generate a proposed measure of difficulty for the challenge. The proposed measure of difficulty is compared to the known difficulty for the input challenge, for example using an objective function, and parameters of the model are updated based on the comparison. Optimisation techniques, such as stochastic gradient descent, may be used to determine the parameter updates from the comparison.

Once trained, the model is tested 512 on a test dataset of challenges. Challenges in the test dataset are input into the machine-learned model, and the output measures of difficulty compared to known difficulty measures for the challenges (or reviewed by a human developer to see if they are appropriate) to determine if the machine-leaned model is sufficiently accurate for use by a challenge generation system.

The test dataset may be a labelled dataset comprising a set of challenges, each with an associated difficulty measure. The labelled training dataset may be a subset of the labelled dataset generated using the proxy measures of difficulty, as described above. Alternatively, the labelled training dataset may be a manually labelled dataset created by reviewers/developers based on their experience.

In some implementations, the test dataset is not a labelled dataset. Instead, the output of the machine-learned model is reviewed by a game designer/developer to determine if the measure of difficulty is appropriate for each challenge. If the game designer/developer approves the results of the machine-learned model on the test dataset, then the machine-learned model may be output for use by the challenge generation system.

In some implementations, if the machine-learned model does not perform sufficiently well on the test dataset, then the proxy metric of difficultly 506 may be updated/adjusted 520 based on the performance of the machine-learned model. The updated proxy metric of difficulty can then be applied to the pre-determined challenged to generate an updated labelled dataset for training a further machine learned model. The training and testing processes are then repeated with the updated labelled dataset. The process may be iterated until a machine-learned model is trained that performs satisfactorily.

Figure 6:
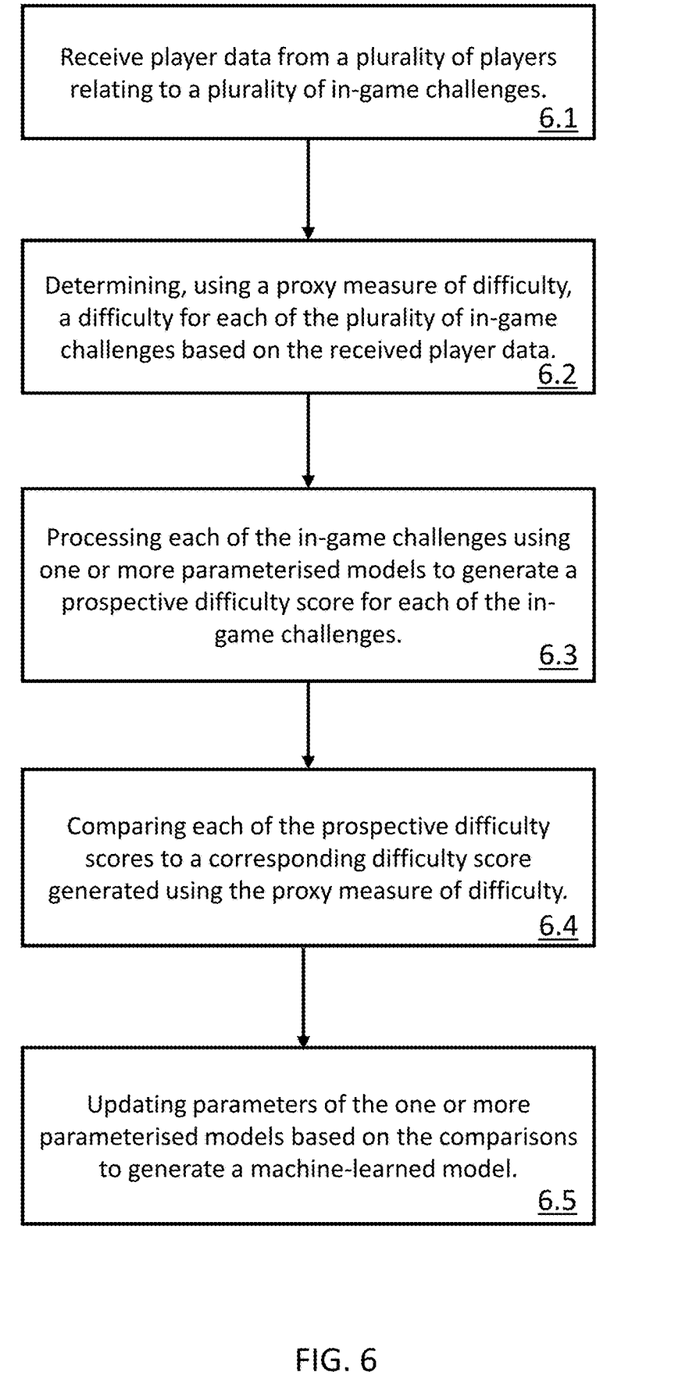
FIG. 6 shows flow diagram of an example method for training a machine-learned model for use in a challenge generation system.

FIG. 6 shows flow diagram of an example method for training a machine-learned model for use in a challenge generation system. The method may be performed by one or more computing devices operating in one or more locations.

At operation 6.1, player data is received from a plurality of players, the player data relating to a plurality of in-game challenges. The player data relates to a particular game or set of related games. The player data may comprise one or more in-game statistics relating to an in-game challenge, such as whether a particular challenge has been completed/started by a player, the time taken to complete a challenge, the number of lives lost while completing a challenge or the like.

At operation 6.2, a proxy measure is difficulty is used to determine a difficulty for each of the plurality of in-game challenges based on the received player data. The proxy measure of difficulty may be a numerical score. The numerical score may be based on one or more of: a number of players completing the challenge; a time taken to complete the challenge; a fraction of players that start the challenge and go on to complete the challenge; and/or a type of player who completes the challenge.

At operation 6.3, each of the in-game challenges is processed using one or more parametrised models to generate a prospective difficulty score for each of the in-game challenges. The parametrised model may be a machine-learned model, such a neural network, a decision tree or a support vector machine.

At operation 6.4, each of the prospective difficulty scores is compared to a corresponding difficulty for the in-game challenge derived in operation 6.2. The comparison may be made using a loss/objective function. For example, an L1 or L2 norm or a cross-entropy may be used to compare the prospective difficulty score for a challenge to the difficulty score for that challenge generated using the proxy measure.

At operation 6.5, parameters of the one or more parametrised models are updated based on the comparisons to generate a machine-learned model. Updating the parameters of a parameterised model may comprise applying an optimisation procedure to the loss/objective function to determine parameter updates. Examples of such an optimisation procedure include stochastic gradient descent.

Operations 6.1 to 6.5 may be iterated over a plurality of training batches until a training threshold condition is satisfied. The training threshold condition may comprise one or more of: a threshold number of iterations; a threshold number of training epochs; a threshold accuracy being reached on a training dataset; and/or a convergence of the loss/objective function to within a threshold value.

In some implementations, the method further comprises testing the trained machine-learned model on a test dataset to determine a model accuracy. If the model accuracy exceeds a threshold accuracy, the model is stored for use by a challenge generation system. If the model accuracy does not exceed a threshold accuracy, the proxy measures of difficulty may be updated and operations 6.2 to 6.5 of the method repeated with the updated proxy measure of difficulty.

Figure 7:
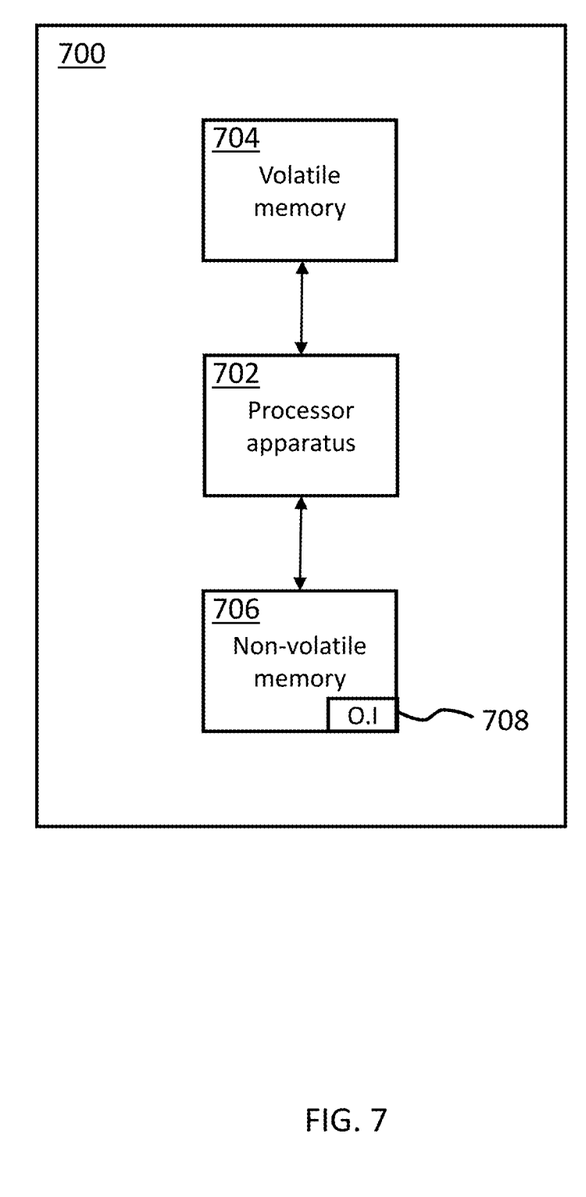
FIG. 7 shows an example of a computer system/apparatus for carrying out any of the methods disclosed herein.

FIG. 7 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 700 comprises one or more processors 702. The one or more processors control operation of other components of the system/apparatus 700. The one or more processors 702 may, for example, comprise a general-purpose processor. The one or more processors 702 may be a single core device or a multiple core device. The one or more processors 702 may comprise a Central Processing Unit (CPU) or a graphical processing unit (GPU). Alternatively, the one or more processors 702 may comprise specialised processing hardware, for instance a RISC processor or programmable hardware with embedded firmware. Multiple processors may be included.

The system/apparatus comprises a working or volatile memory 704. The one or more processors may access the volatile memory 704 in order to process data and may control the storage of data in memory. The volatile memory 704 may comprise RAM of any type, for example, Static RAM (SRAM), Dynamic RAM (DRAM), or it may comprise Flash memory, such as an SD-Card.

The system/apparatus comprises a non-volatile memory 706. The non-volatile memory 706 stores a set of operation instructions 708 for controlling the operation of the processors 702 in the form of computer readable instructions. The non-volatile memory 706 may be a memory of any kind such as a Read Only Memory (ROM), a Flash memory or a magnetic drive memory.

The one or more processors 702 are configured to execute operating instructions 708 to cause the system/apparatus to perform any of the methods described herein. The operating instructions 708 may comprise code (i.e. drivers) relating to the hardware components of the system/apparatus 700, as well as code relating to the basic operation of the system/apparatus 700. Generally speaking, the one or more processors 702 execute one or more instructions of the operating instructions 708, which are stored permanently or semi-permanently in the non-volatile memory 706, using the volatile memory 704 to store temporarily data generated during execution of said operating instructions 708.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 7, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims and their equivalents.

The invention claimed is:

1. A computer implemented method comprising:
receiving input data, the input data comprising data relating to a user of a computer game;
generating, based on the input data, one or more candidate challenges for the computer game, comprising:
determining one or more search constraints based on the input data; and
searching among one or more ranges of challenge parameters based on the one or more search constraints to generate the one or more candidate challenges;
determining, using a machine-learned model, whether each of the one or more candidate challenges satisfies a threshold condition, wherein the threshold condition is based on a target challenge difficultly;
in response to a positive determination, outputting the one or more candidate challenges that satisfy the threshold condition for use in the computer game by the user.

2. The computer implemented method of claim 1, wherein the method further comprises:
in response to a negative determination that one or more candidate challenges satisfies the threshold condition:
updating the one or more search constraints based on output of the machine-learnedmodel;
re-searching among the one or more ranges of challenge parameters based on the one or more updated constraints to generate one or more further candidate challenges;
determining, using the machine-learned model, whether the one or more further candidate challenges satisfies the threshold condition; and in response to a positive determination, outputting the one or more further candidate challenges that satisfy the threshold condition for use in the computer game by the user.

3. The computer implemented method of claim 1, wherein determining one or more search constraints based on the input data comprises processing the input data using a game-specific logic.

4. The computer implemented method of claim 1, wherein the one or more search constraints comprises: a cost-reward metric; a consistency condition for preventing mutually exclusive challenge parameters in each of the one or more candidate challenges; and/or game-specific in-game logic constraints.

5. The computer implemented method of claim 1, wherein the input data comprises metric data generated from in-game data associated with the user of the computer game.

6. The computer implemented method of claim 5, wherein the input data further comprises one or more of: in-game economic data; designer constraints; and/or real-world data extracted from a news feed using natural language processing.

7. The computer implemented method of claim 1, wherein determining, using the machine-learned model, whether each of the one or more candidate challenges satisfies the threshold condition comprises:
generating, using the machine-learned model, a score for each of the one or more candidate challenges, the score indicative of a difficultly of the one or more candidate challenges; and
comparing the score to a threshold score associated with the user.

8. Apparatus comprising one or more processors and a memory, the memory comprising instructions that, when executed by the one or more processors, cause the apparatus to perform operations comprising:
receiving input data, the input data comprising data relating to a user of a computer game;
generating, based on the input data, one or more candidate challenges for the computer game, comprising:
determining one or more search constraints based on the input data; and
searching among one or more ranges of challenge parameters based on the one or more search constraints to generate the one or more candidate challenges;
determining, using a machine-learned model, whether each of the one or more candidate challenges satisfies a threshold condition, wherein the threshold condition is based on a target challenge difficultly;
in response to a positive determination, outputting the one or more candidate challenges that satisfy the threshold condition for use in the computer game by the user.

9. The apparatus of claim 8, wherein the operations further comprise:
in response to a negative determination that the one or more candidate challenges satisfies the threshold condition:
updating the one or more search constraints based on output of the machine-learnedmodel;
re-searching among the one or more ranges of challenge parameters based on the one or more updated constraints to generate one or more further candidate challenges;
determining, using the machine-learned model, whether the one or more further candidate challenges satisfies the threshold condition; and
in response to a positive determination, outputting the one or more further candidate challenges that satisfy the threshold condition for use in the computer game by the user.

10. The apparatus of claim 8, wherein determining one or more search constraints based on the input data comprises processing the input data using a game-specific logic.

11. The apparatus of claim 8, wherein the one or more search constraints comprises: a cost-reward metric; a consistency condition for preventing mutually exclusive challenge parameters in each of the one or more candidate challenges; and/or game-specific in-game logic constraints.

12. The apparatus of claim 8, wherein the input data comprises metric data generated from in-game data associated with the user of the computer game.

13. The apparatus of claim 12, wherein the input data further comprises one or more of: in-game economic data; designer constraints; and/or real-world data extracted from a news feed using natural language processing.

14. The apparatus of claim 8, wherein determining, using the machine-learned model, whether each of the one or more candidate challenges satisfies the threshold condition comprises:
generating, using the machine-learned model, a score for each of the one or more candidate challenges, the score indicative of a difficultly of the one or more candidate challenge; and
comparing the score to a threshold score associated with the user.

15. A computer implemented method comprising:
receiving player data from a plurality of players relating to a plurality of in-game challenges;
determining a proxy measure of difficulty for each of the plurality of in-game challenges based on the received player data;
processing each of the plurality of in-game challenges using one or more parametrised models to generate a prospective difficulty score for each of the plurality of in-game challenges;
comparing each of the prospective difficulty scores to a corresponding proxy measure of difficulty for the in-game challenge; and
updating parameters of the one or more parametrised models based on the comparisons to generate a machine-learned model,
wherein:
the plurality of players is divided into a plurality of player types in dependence on the received player data;
the proxy measure of difficulty for each of the plurality of in game-challenges comprises a plurality of difficulty measures, each corresponding to a player type; and
the one or more parameterised models comprises a plurality of parameterised models, each corresponding to one of the player types and updated based on data from the corresponding player type.

16. The computer implemented method of claim 15, wherein the proxy measure of difficulty is based on one or more of: a number of players completing the challenge; a time taken to complete the challenge; a fraction of players that start the challenge and go on to complete the challenge; and/or a type of player who completes the challenge.

17. The computer implemented method of claim 15, further comprising:
testing the machine-learned model on a test dataset comprising a plurality of in-game challenges; and updating the proxy measure of difficulty based on the testing.

\* \* \* \* \*

UNITED STATES PATENT AND TRADEMARK OFFICE
CERTIFICATE OF CORRECTION

| | |
|---|---|
| PATENT NO. | : 11,413,541 B2 |
| APPLICATION NO. | : 16/891723 |
| DATED | : August 16, 2022 |
| INVENTOR(S) | : Jesse Harder et al. |

It is certified that error appears in the above-identified patent and that said Letters Patent is hereby corrected as shown below:

In the Specification

In Column 3, Line 12, after "may" insert -- be --.

In Column 3, Line 48, delete "too" and insert -- 100 --, therefor.

In Column 3, Line 49, delete "too" and insert -- 100 --, therefor.

In Column 4, Line 57, delete "too" and insert -- 100 --, therefor.

In Column 5, Line 40, after "Z'" insert -- . --.

In Column 6, Line 14, delete "compete" and insert -- complete --, therefor.

In Column 9, Line 27, delete "was" and insert -- way --, therefor.

In Column 10, Line 23, delete "plyer" and insert -- player --, therefor.

In the Claims

In Column 14, Claim 2, Line 60, delete "machine-learnedmodel;" and insert -- machine-learned model; --, therefor.

In Column 15, Claim 9, Line 60, delete "machine-learnedmodel;" and insert -- machine-learned model; --, therefor.

In Column 16, Claim 14, Line 28, delete "challenge;" and insert -- challenges; --, therefor.

Signed and Sealed this
First Day of November, 2022

*Katherine Kelly Vidal*

Katherine Kelly Vidal
*Director of the United States Patent and Trademark Office*